US010750244B2

(12) United States Patent
Silver et al.

(10) Patent No.: US 10,750,244 B2
(45) Date of Patent: *Aug. 18, 2020

(54) SUGGESTIVE CONTENT BASED ON HABIT

(71) Applicant: AT&T Intellectual Property I, L.P., Atlanta, GA (US)

(72) Inventors: Edward Michael Silver, Atlanta, GA (US); Linda Ann Roberts, Decatur, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,003

(22) Filed: Aug. 11, 2016

(65) Prior Publication Data

US 2016/0353179 A1    Dec. 1, 2016

Related U.S. Application Data

(63) Continuation of application No. 14/737,638, filed on Jun. 12, 2015, now Pat. No. 9,432,743, which is a
(Continued)

(51) Int. Cl.
| | | |
|---|---|---|
| H04N 7/16 | (2011.01) | |
| H04N 21/482 | (2011.01) | |
| H04N 21/442 | (2011.01) | |
| H04N 21/45 | (2011.01) | |
| H04N 21/458 | (2011.01) | |
| H04N 21/462 | (2011.01) | |
| H04N 21/466 | (2011.01) | |
| H04N 21/488 | (2011.01) | |
| H04N 21/84 | (2011.01) | |
| H04N 21/262 | (2011.01) | |
| H04N 21/472 | (2011.01) | |
| H04N 21/426 | (2011.01) | |
| H04N 5/445 | (2011.01) | |

(52) U.S. Cl.
CPC ... *H04N 21/4826* (2013.01); *H04N 21/26283* (2013.01); *H04N 21/44222* (2013.01); *H04N 21/4532* (2013.01); *H04N 21/4586* (2013.01); *H04N 21/4622* (2013.01); *H04N 21/4667* (2013.01); *H04N 21/4668* (2013.01); *H04N 21/472* (2013.01); *H04N 21/4882* (2013.01); *H04N 21/84* (2013.01); *H04N 5/445* (2013.01); *H04N 21/42676* (2013.01)

(58) Field of Classification Search
CPC .. H04H 60/43; H04H 60/33; H04N 21/44222; H04N 21/435; H04N 21/8166; H04N 21/6547; H04N 21/4126; H04N 7/17309; H04N 7/17318; H04N 7/163
USPC .... 725/14, 68, 131–134, 139–142, 151–153; 709/217–232; 348/734
See application file for complete search history.

(56) References Cited

U.S. PATENT DOCUMENTS

| | | | |
|---|---|---|---|
| 4,638,359 | A | 1/1987 | Watson |
| 4,706,121 | A | 11/1987 | Young |
| (Continued) | | | |

*Primary Examiner* — Annan Q Shang
(74) *Attorney, Agent, or Firm* — Scott P. Zimmerman, PLLC

(57) ABSTRACT

Suggestions for content are based on a habit of a user. As the user requests content, content selections are monitored for habitual selections according to channels, titles, or genres. A programming guide may then be customized based on the habitual selections.

20 Claims, 6 Drawing Sheets

Related U.S. Application Data continuation of application No. 14/280,709, filed on May 19, 2014, now Pat. No. 9,084,024, which is a continuation of application No. 13/848,081, filed on Mar. 21, 2013, now Pat. No. 8,739,221, which is a continuation of application No. 09/955,217, filed on Sep. 19, 2001, now Pat. No. 8,429,688.

(56) References Cited

U.S. PATENT DOCUMENTS

| | | |
|---|---|---|
| 4,751,578 A | 6/1988 | Reiter et al. |
| 4,792,864 A | 12/1988 | Watanabe et al. |
| 4,908,713 A | 3/1990 | Levine |
| 4,963,994 A | 10/1990 | Levine |
| 4,977,455 A | 12/1990 | Young |
| 5,038,211 A | 8/1991 | Hallenbeck |
| 5,123,046 A | 6/1992 | Levine |
| 5,151,789 A | 9/1992 | Young |
| 5,155,591 A | 10/1992 | Wachob |
| D336,417 S | 6/1993 | Yuen et al. |
| D338,202 S | 8/1993 | Yuen et al. |
| D338,203 S | 8/1993 | Yuen et al. |
| 5,293,357 A | 3/1994 | Hallenbeck |
| 5,297,204 A | 3/1994 | Levine |
| D346,169 S | 4/1994 | Wannier et al. |
| 5,307,173 A | 4/1994 | Yuen et al. |
| D348,268 S | 6/1994 | Chambers |
| D349,118 S | 7/1994 | Yuen |
| 5,335,079 A | 8/1994 | Yuen et al. |
| 5,353,121 A | 10/1994 | Young et al. |
| 5,365,282 A | 11/1994 | Levine |
| 5,373,330 A | 12/1994 | Levine |
| 5,377,317 A | 12/1994 | Bates et al. |
| 5,382,983 A | 1/1995 | Kwoh et al. |
| 5,398,074 A | 3/1995 | Duffield |
| 5,414,756 A | 5/1995 | Levine |
| 5,420,647 A | 5/1995 | Levine |
| D364,166 S | 11/1995 | Yuen |
| 5,475,382 A | 12/1995 | Yuen et al. |
| 5,479,266 A | 12/1995 | Young et al. |
| 5,479,268 A | 12/1995 | Young et al. |
| 5,488,409 A | 1/1996 | Yuen et al. |
| 5,508,815 A | 4/1996 | Levine |
| 5,515,173 A | 5/1996 | Mankovitz et al. |
| 5,523,794 A | 6/1996 | Mankovitz et al. |
| 5,532,732 A | 7/1996 | Yuen et al. |
| 5,532,754 A | 7/1996 | Young et al. |
| 5,539,391 A | 7/1996 | Yuen |
| 5,543,852 A | 8/1996 | Yuen et al. |
| 5,550,576 A | 8/1996 | Klosterman |
| 5,552,837 A | 9/1996 | Mankovitz |
| 5,553,123 A | 9/1996 | Chan et al. |
| 5,559,550 A | 9/1996 | Mankovitz |
| 5,568,272 A | 10/1996 | Levine |
| 5,574,934 A * | 11/1996 | Mirashrafi .......... G06Q 10/10 |
| | | 348/E7.082 |
| 5,583,560 A * | 12/1996 | Florin .................... G09B 5/14 |
| | | 348/E7.054 |
| 5,585,865 A | 12/1996 | Amano et al. |
| 5,592,551 A * | 1/1997 | Lett .................... G06K 7/0047 |
| | | 380/211 |
| 5,596,373 A | 1/1997 | White |
| D377,797 S | 2/1997 | Stropkay et al. |
| 5,600,711 A | 2/1997 | Yuen |
| 5,619,274 A | 4/1997 | Roop et al. |
| 5,619,383 A | 4/1997 | Ngai |
| 5,621,579 A | 4/1997 | Yuen |
| 5,635,989 A | 6/1997 | Rothmuller |
| 5,659,367 A | 8/1997 | Yuen |
| 5,673,089 A | 9/1997 | Yuen et al. |
| 5,684,525 A | 11/1997 | Klosterman |
| 5,692,214 A | 11/1997 | Levine |
| 5,701,383 A | 12/1997 | Russo et al. |
| 5,716,273 A | 2/1998 | Yuen |
| 5,719,637 A | 2/1998 | Ohkura et al. |
| 5,724,521 A * | 3/1998 | Dedrick ............. G06Q 30/0601 |
| | | 705/26.1 |
| 5,727,060 A | 3/1998 | Young |
| 5,734,444 A | 3/1998 | Yoshinobu |
| 5,748,716 A | 5/1998 | Levine |
| 5,790,198 A | 8/1998 | Roop et al. |
| 5,798,785 A | 8/1998 | Hendricks et al. |
| 5,801,747 A | 9/1998 | Bedard |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,812,931 A | 9/1998 | Yuen |
| 5,822,123 A | 10/1998 | Davis et al. |
| 5,828,945 A | 10/1998 | Klosterman |
| RE35,954 E | 11/1998 | Levine |
| 5,852,478 A | 12/1998 | Kwoh |
| 5,867,226 A * | 2/1999 | Wehmeyer .......... H04N 5/44543 |
| | | 348/569 |
| 5,880,768 A | 3/1999 | Lemmons et al. |
| 5,920,477 A | 7/1999 | Hoffberg et al. |
| 5,940,071 A * | 8/1999 | Treffers ............. H04N 7/17336 |
| | | 348/E7.073 |
| 5,945,988 A | 8/1999 | Williams et al. |
| 5,977,964 A * | 11/1999 | Williams ............. G11B 27/105 |
| | | 348/E17.005 |
| 6,003,041 A * | 12/1999 | Wugofski ................ H04N 5/46 |
| 6,025,837 A | 2/2000 | Matthews et al. |
| 6,118,498 A | 9/2000 | Reitmeier |
| 6,128,009 A * | 10/2000 | Ohkura ............. H04N 5/44543 |
| | | 725/46 |
| 6,163,316 A | 12/2000 | Killian |
| 6,169,728 B1 * | 1/2001 | Perreault ................ H04H 20/42 |
| | | 348/E7.07 |
| 6,177,931 B1 | 1/2001 | Alexander et al. |
| 6,253,188 B1 * | 6/2001 | Witek .................. G06Q 10/087 |
| | | 705/14.54 |
| 6,314,064 B1 * | 11/2001 | Ueda .................... G11B 7/0912 |
| | | 369/112.24 |
| 6,615,024 B1 * | 9/2003 | Boros .................... H01Q 1/246 |
| | | 455/562.1 |
| 6,681,396 B1 | 1/2004 | Bates et al. |
| 6,691,106 B1 * | 2/2004 | Sathyanarayan ... G06F 16/9535 |
| 6,756,997 B1 | 6/2004 | Ward et al. |
| 6,789,120 B1 * | 9/2004 | Lee ................... H04L 29/06027 |
| | | 370/352 |
| 6,845,374 B1 * | 1/2005 | Oliver ............... G06F 17/30675 |
| 6,917,972 B1 * | 7/2005 | Basko .................... G06Q 30/02 |
| | | 709/223 |
| 6,934,917 B2 | 8/2005 | Lin |
| 6,956,833 B1 * | 10/2005 | Yukie ..................... H04L 67/306 |
| | | 370/328 |
| 6,990,676 B1 | 1/2006 | Proehl et al. |
| 7,240,355 B1 * | 7/2007 | Eldering ............ H04N 21/2353 |
| | | 348/E5.002 |
| 7,284,256 B2 | 10/2007 | Candelore et al. |
| 7,313,806 B1 * | 12/2007 | Williams ............... H04N 7/0887 |
| | | 348/E7.036 |
| 7,328,177 B1 * | 2/2008 | Lin-Hendel ............ G06Q 30/02 |
| | | 705/26.7 |
| 7,665,111 B1 * | 2/2010 | Barton ............... G11B 20/0021 |
| | | 725/58 |
| 7,788,339 B1 * | 8/2010 | Srinivasan ............. H04L 67/06 |
| | | 709/219 |
| 7,966,369 B1 | 6/2011 | Briere et al. |
| 8,281,001 B2 | 10/2012 | Busam et al. |
| 8,302,127 B2 * | 10/2012 | Klarfeld ............. G11B 27/105 |
| | | 725/46 |
| 8,438,487 B1 * | 5/2013 | Lin-Hendel ........... G06F 3/0482 |
| | | 715/739 |
| 8,478,114 B1 * | 7/2013 | Beach ................ G06F 11/1417 |
| | | 386/296 |
| 8,650,496 B1 * | 2/2014 | Van Gestel ............ H04B 1/034 |
| | | 715/745 |
| 9,043,228 B1 | 5/2015 | Ross, Jr. et al. |
| 9,269,107 B2 * | 2/2016 | Boulter ............. G06F 17/30761 |
| 9,419,665 B2 * | 8/2016 | Ellis .................... G06F 3/04883 |

(56) References Cited

U.S. PATENT DOCUMENTS

| | | | |
|---|---|---|---|
| 2001/0049826 A1* | 12/2001 | Wilf | H04N 5/50 |
| | | | 725/120 |
| 2002/0010932 A1 | 1/2002 | Nguyen et al. | |
| 2002/0040326 A1* | 4/2002 | Spratt | G06F 17/30867 |
| | | | 705/26.62 |
| 2002/0104081 A1 | 8/2002 | Candelore et al. | |
| 2002/0116471 A1* | 8/2002 | Shteyn | H04N 7/088 |
| | | | 709/217 |
| 2002/0120528 A1* | 8/2002 | Hutten | G06Q 30/02 |
| | | | 705/14.53 |
| 2002/0124248 A1* | 9/2002 | Matey | H04N 21/235 |
| | | | 725/22 |
| 2002/0144289 A1* | 10/2002 | Taguchi | H04N 7/17318 |
| | | | 725/112 |
| 2002/0152459 A1* | 10/2002 | Bates | H04H 60/40 |
| | | | 725/9 |
| 2002/0152463 A1* | 10/2002 | Dudkiewicz | H04H 60/37 |
| | | | 725/46 |
| 2002/0152474 A1* | 10/2002 | Dudkiewicz | H04N 7/163 |
| | | | 725/136 |
| 2002/0178394 A1 | 11/2002 | Bamberger et al. | |
| 2002/0188955 A1* | 12/2002 | Thompson | H04N 5/76 |
| | | | 725/110 |
| 2003/0056216 A1 | 3/2003 | Wugofski et al. | |
| 2003/0110499 A1* | 6/2003 | Knudson | G06Q 30/0241 |
| | | | 725/42 |
| 2003/0200172 A1* | 10/2003 | Randle | G06Q 20/04 |
| | | | 705/39 |
| 2005/0149972 A1* | 7/2005 | Knudson | G06F 3/0482 |
| | | | 725/56 |
| 2005/0235318 A1* | 10/2005 | Grauch | G06Q 30/02 |
| | | | 725/46 |
| 2018/0165253 A1* | 6/2018 | Bimson | G06F 16/986 |

\* cited by examiner

SUGGESTIVE CONTENT BASED ON HABIT

CROSS-REFERENCE TO RELATED APPLICATIONS

This application is a continuation of U.S. application Ser. No. 14/737,638 filed Jun. 12, 2015 and since issued as U.S. Pat. No. 9,432,743, which is a continuation of U.S. application Ser. No. 14/280,709 filed May 19, 2014 and since issued as U.S. Pat. No. 9,084,024, which is a continuation of U.S. application Ser. No. 13/848,081 filed Mar. 21, 2013 and since issued as U.S. Pat. No. 8,739,221, which is a continuation of U.S. application Ser. No. 09/955,217 filed Sep. 19, 2001 and since issued as U.S. Pat. No. 8,429,688, with all applications incorporated herein by reference in their entireties.

BACKGROUND

Field of the Invention

The present invention relates to entertainment systems, and more particularly, to a system and method for generating a television (TV) programming guide.

Background of the Invention

With cable and satellite TV technologies, a TV set can receive broadcast signals through hundreds of channels. A TV set "tunes in" to a channel selected by a viewer. For TV sets that have two tuners, a viewer can see a first program of a first channel in the monitor and a second program of a second channel in a smaller "window" within the same monitor. Each tuner is typically controlled by the viewer using a remote control unit.

"Channel surfing" involves a viewer tuning in to a first channel, quickly determining whether he or she wishes to watch the program of the first channel, and tuning in to a second channel. The process repeats for additional channels. With hundreds of channels available for surfing, it can take the viewer a long time to find a desirable program. Channel surfing is often performed by the user by repeatedly pressing one of the "Channel Up" and the "Channel Down" buttons on the remote control unit.

Recognizing that channel surfing is time consuming, a number of solutions have been offered by TV set manufacturers. One solution is to make the remote control unit programmable. A user of a programmable remote control unit can designate certain channels as his or her "favorite" or "frequently watched" channels. One example of this solution is to program the "Channel Up" button and the "Channel Down" button so that when one of them is pressed, only those channels previously designated as "favorite" will be tuned in. For example, when a viewer presses the "Channel Up" button repeatedly, instead of sequentially tuning in to Channels 1, 2, 3, 4, 5, 6, 7, etc., the solution enables to viewer to scan only Channels 2, 4, and 7, assuming that these three channels have been designated by the viewer to be his "favorite" or "frequently watched" channels.

Additional efforts have been made to help viewers navigate through hundreds of TV channels without requiring them to affirmatively program the remote control unit or the TV set itself.

For example, U.S. Pat. No. 5,585,865 issued to Amano et al. ("The Amano Patent") on Dec. 17, 1996, discloses a "television broadcast receiver which selects programs by genre and past viewing habits." When an Amano receiver receives a genre code from a user, the receiver tunes in the channel that has a past record of highest frequency of reception among all channels that are associated with the genre code. The Amano Patent is incorporated herein by reference in its entirety.

U.S. Pat. No. 5,734,444 issued to Yoshinobu ("The Yoshinobu Patent") on May 31, 1998, discloses a "broadcast receiving apparatus that automatically records frequency [sic] watched programs." The Yoshinobu apparatus automatically records a user's frequently tuned in programming when the user is not watching the programming at the day and time when the user is expected to tune in to the channel. The Yoshinobu Patent is incorporated herein by reference in its entirety.

U.S. Pat. No. 5,945,988 issued to Williams et al. ("The Williams Patent") on Aug. 31, 1999, discloses a "method and apparatus for automatically determining and dynamically updating user preferences in an entertainment system." The Williams invention monitors a user's interaction with an entertainment system. Based on the interaction, the invention can automatically determine which of a plurality of users is currently using the entertainment system. The Williams Patent is incorporated herein by reference in its entirety.

U.S. Pat. No. 6,128,009 issued to Ohkura et al. ("The Ohkura Patent") on Oct. 3, 2000, discloses a "Program guide controller." In this invention, programs of high viewing frequency of a user are automatically registered, permitting registered programs to be included in genre information. The Ohkura Patent is incorporated herein by reference in its entirety.

SUMMARY OF THE INVENTION

The present invention is a system and method for generating a broadcast programming guide. One embodiment of the present invention is a broadcast signals receiver that contains a tuner, a microcomputer, a memory, and an output device. The tuner is adapted to select a specific channel out of many that are broadcast by stations. The microcomputer is adapted to monitor activities of the tuner. The microcomputer stores the result of monitoring in the memory. After a suitable time period of monitoring, the microcomputer generates a programming guide based at least in part on the result. Preferably, the programming guide contains programming information obtained from one or more external sources. After the programming guide is generated and when the receiver is powered on or when the programming guide is requested by a user of the receiver, the programming guide is reproduced on the output device. Reproduction can be an audio output by a speaker or a video display by a monitor, or both, depending on the type of output device equipped with the receiver.

One method for generating the programming guide involves the following steps. First, one or more favorite channels are recognized by the receiver based on how the tuner has been controlled by a user over a predetermined period of time. In other words, the habit of the user during that time period is interpreted by the microcomputer to determine which are his or her favorite channels. Alternatively, the user may designate the favorite channels by directly inputting them in the memory of the receiver.

Second, the microcomputer of a preferred embodiment, via a modem, retrieves programming information for the favorite channels from one or more external sources. The external sources may be, for example, host computers or web sites of broadcast stations or other entities that provide broadcast programming information. Third, the microcomputer generates a programming guide based on the favorite channels and the programming information. Finally, the programming guide is reproduced by an output device of the receiver when the receiver is powered on or when the programming guide is requested by the user.

In one embodiment in which the present invention is incorporated in a TV set that has access to multiple channels, the invention can generate a short list of suggested channels for the television user. In one specific implementation of the present invention, the viewer's habit for using the television can be used to cull a list of suggested channels out of a substantially larger number of available channels. For example, in accordance with one aspect of the present invention, after the viewer has used his television set for a period of, e.g., three weeks, the short list can comprise four suggested channels out of 400 available channels. The first two suggested channels may be, for example, the viewer's most frequently watched channels. Each of the next two suggested channels may be, for example, a channel similar to one of the first two channels, but that which has not been tuned in by the viewer in the past. A number of criteria can be used to generate the list of suggested channels.

Accordingly, none of the prior art references, standing alone or in combination, teaches a system and method that would provide a user of a TV set, or other broadcast program receivers, a customized programming guide in accordance with the present invention.

DETAILED DESCRIPTION OF PREFERRED EMBODIMENTS

Figure 1:
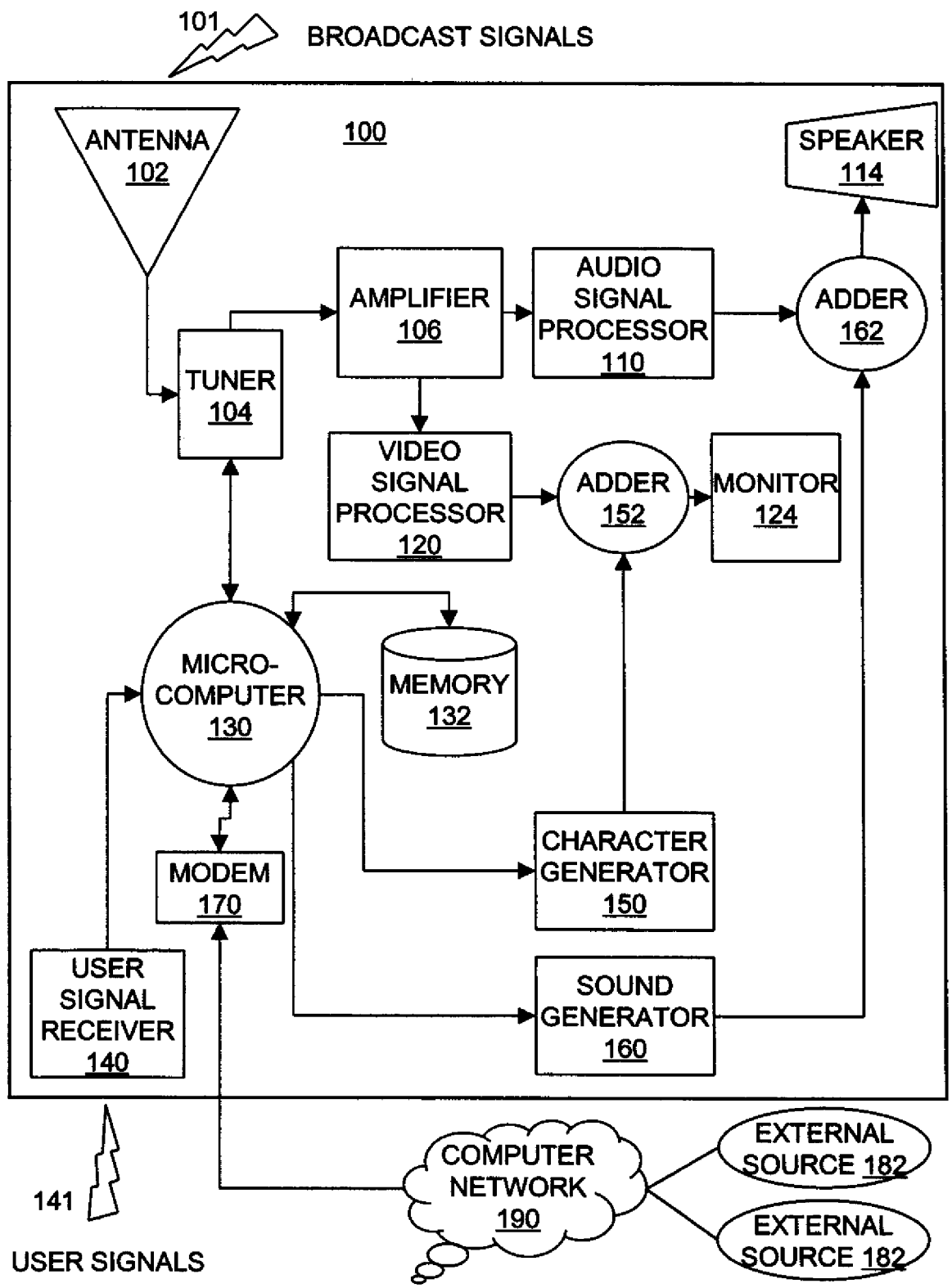
FIG. 1 is a block diagram illustrating a receiver according to an embodiment of the present invention.

FIG. 1 is a block diagram illustrating receiver 100 according to an embodiment of the present invention. It is noted that receiver 100 can be a TV set, a radio receiver, a video cassette recorder, a cable TV or satellite TV set top box, or other similar devices that can receive and process broadcast signals in multiple channels. For discussion purposes, the exemplary receiver depicted in FIG. 1 is a TV set.

Antenna 102 of receiver 100 is adapted to receive broadcast signals 101 that are transmitted by one or more TV stations (not shown). Antenna 102 supplies broadcast signals 101 to tuner 104. Amplifier 106, audio signal processor 110, and video signal processor 120 process these signals for output by speaker 114 and for display on monitor 124. One or more of the patents that have been incorporated by reference disclose a system and method for receiving and reproducing broadcast signals.

For cable TV programming, tuner 104 can be adapted to received broadcast signals 101 from a cable TV programs provider via a cable (not shown). Similarly, for satellite TV programming, tuner 104 can be adapted to receive broadcast signals 101 from a satellite through a satellite dish and a cable (not shown).

Microcomputer 130 is in communication with tuner 104. Microcomputer 130 can process information related to tuner 104 and store the information in memory 132. In addition, microcomputer 130 can retrieve the information from memory 132 to operate or control tuner 104.

Microcomputer 130 is in communication with user signal receiver 140. User signal receiver 140 is adapted to receive user signals 141 comprising a user's input. For example, in one embodiment, user signal receiver 140 can be a remote control signal receiver that is adapted to receive a signal generated by a remote control unit (not shown). In another embodiment, user signal receiver 140 can be adapted to receive electrical or electronic signals generated by the user using other methods. For example, user signal receiver 140 can be adapted to receiver user signals 141 from an input device (not shown) connected to receiver 100. The input device may be a keyboard, a mouse, a track ball, or another similar device. User signals 141 received from the user can also be stored in memory 132.

Microcomputer 130 is also in communication with character generator 150 and sound generator 160. Character generator 150 can be instructed by microcomputer 130 to generate characters. The characters generated can then be added to a video signal by adder 152 for display on monitor 124 or another output device. Similarly, sound generator 160 can be instructed by microcomputer 130 to generate sound to be mixed by adder 162 for output by speaker 114. Speaker 114 and monitor 124 are two types of output devices. An audio switch (not shown) and a video switch (not shown) that are controlled by microcomputer 130 can be used to select whether outputs of sound generator 160 and character generator 150 should be reproduced by speaker 114 and monitor 124, respectively.

Furthermore, microcomputer 130 can be adapted to receive information from a number of external sources. For example, microcomputer 130 can be adapted to have access to computer network 190. Preferably, computer network 190 is the Internet, from which microcomputer 130 can obtain specific information as explained below. In other embodiments, computer network 190 can be a local area network or a wide area network. For example, information available at external sources 182 can be obtained by microcomputer 130 via modem 170 and computer network 190. External sources 182 can be, for example, host computers or web sites associated with broadcast stations. External sources 182 may also be other entities that provide programming information for broadcast signal receivers.

Figure 2:
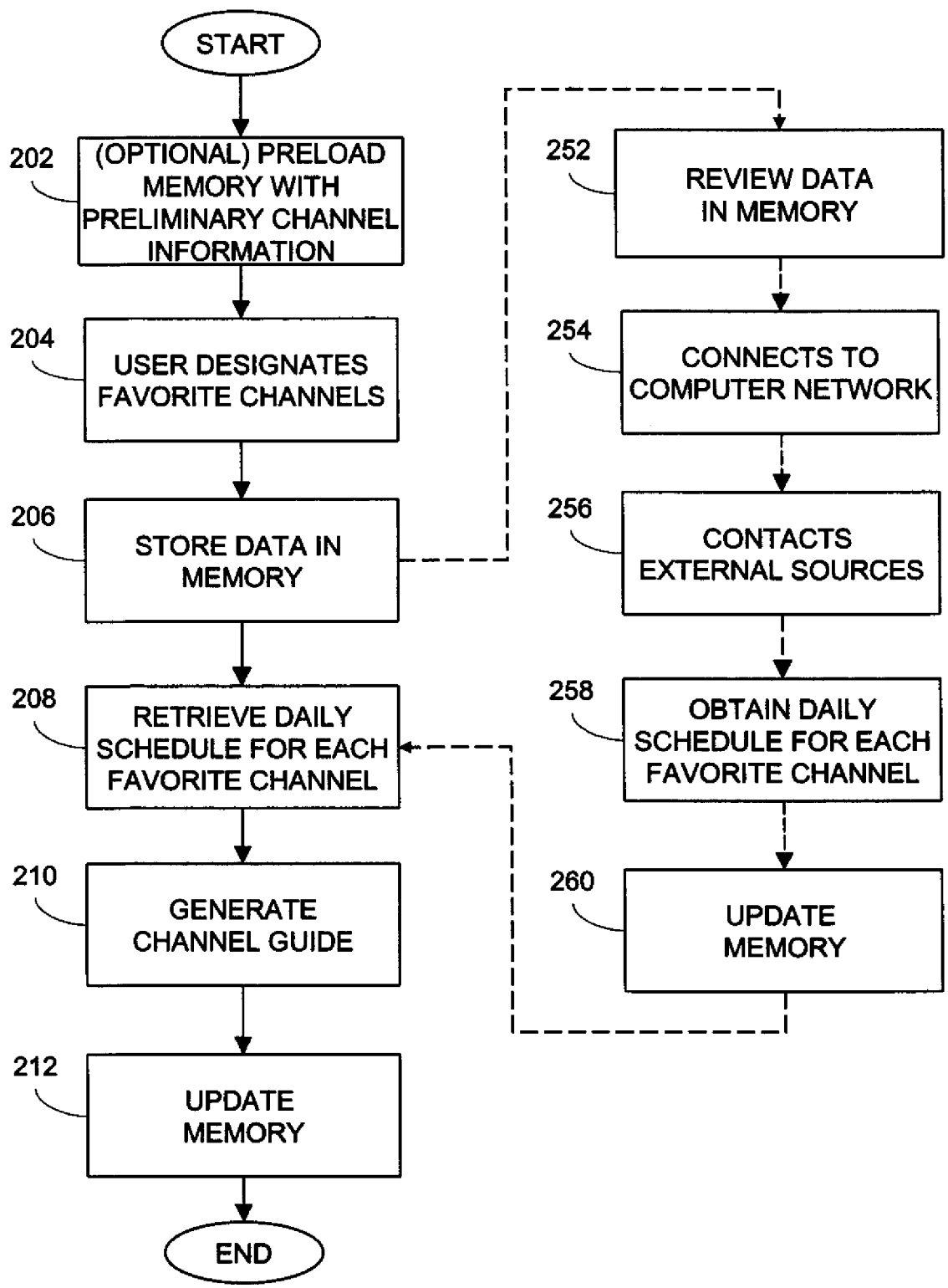
FIG. 2 is a flowchart illustrating exemplary steps involved in generating a programming guide in accordance with one embodiment of the present invention.

FIG. 2 is a flowchart illustrating exemplary steps involved in generating a programming guide for a TV set in accordance with one embodiment of the invention.

In optional step 202, memory 132 of receiver 100 is preloaded with preliminary channel information. The preliminary channel information can be supplied by a manufacturer or vendor of receiver 100. For example, if receiver 100 is designed for a user or purchaser in a specific geographic market, memory 132 may be preloaded with information related to broadcast programs that are receivable by receiver 100 in that market. In one specific implementation of the present invention, for example, the preliminary channel information stored in memory 132 can include the information shown in Table 1 below.

TABLE 1

| Preliminary Channel Information | | |
|---|---|---|
| Channel | Station | Network Address |
| 14 | WNBC | www.wnbc.com |
| 17 | WABC | www.wabc.com |
| 19 | WCBS | www.wnbc.com |

Information contained in the left column of Table 1 represents the numeric channel designations that are associated with specific broadcast frequencies. In Table 1 shown above, for example, Channels 14, 17, and 19 are associated with Stations WNBC, WABC, and WCBS, respectively, as indicated in the middle column. Each of these stations is also associated with a network address, which is shown in the right column of Table 1. In an example in which computer network 190 uses TCP/IP, the network addresses for the stations can be uniform resource locators (URL). It is noted that Table 1 can contain information related to hundreds of channels.

Step 202 is optional. However, regardless of whether memory 132 has been preloaded with the preliminary channel information in step 202, at the start of the process memory 132 does not contain any user specific information.

In step 204, when a user brings home the TV set, the user can decide whether or not to supplement memory 132 with user-specific information. The supplemental user-specific information may comprise, for example, a short list of the user's favorite channels. For example, as the user channel surfs, the user may designate one or more channels as his or her favorite channels. Designation of favorite channels may be accomplished by pressing a specific button on the TV set or its remote control unit. For illustration purposes, assume that memory 132 were preloaded with Table 1 above. In addition, assume further than the user adopts two of the channels in Table 1 as his or her favorite channels, and the user designates two additional channels as his or her favorite channels. As explained below in a different embodiment (see FIG. 3) of the present invention, designation of the user's favorite channels can be done dynamically.

In step 206, receiver 100 stores the data created in step 204 in memory 132. At the conclusion of step 206, Table 1 may be modified or updated based on the example and assumption discussed above, to become Table 2 shown below.

TABLE 2

| User-Specific Channels | | |
|---|---|---|
| Channel | Station | Network Address |
| 14 | WNBC | www.wnbc.com |
| 17 | WABC | www.wabc.com |
| 21 | WGAM | www.sportngames.com |
| 23 | WPUB | www.localpbs.com |

In step 208, microcomputer 130 retrieves programming schedule for each channel listed in Table 2. The programming schedules may be retrieved from memory 132 or directly from external sources 182.

Preferably, once a day and at a specific time of the day, for example, at 12:01 am (or at other time), microcomputer 130, in step 252, reviews data in memory 132 to determine what information it has and what additional details it needs from external sources 182.

In step 254, microcomputer 130 establishes a data communication session with computer network 190 via modem 170. The data communication session may be accomplished in one of several ways. For example, the session may be established using a conventional telephone line, a digital subscriber line, or other known methods.

During the data communication session, in step 256, microcomputer 130 contacts external sources 182 that are associated with the stations listed in Table 2. External sources 182 can be one or more host computers or web sites of the stations listed in Table 2. External sources 182 may also be associated with an entity that provides broadcast programming guides for a plurality of broadcast stations including those listed in Table 2.

In step 258, microcomputer 130 obtains daily programming schedules from external sources 182. In step 260, microcomputer 130 updates memory 132 with the daily programming schedules obtained in step 258.

It is noted that steps 252 through 260 may be optional, they may be performed more than once for a particular day, or they may be performed once every few days.

In step 210, information obtained in step 208 can be used by receiver 100 to generate a programming guide or a channel guide. Table 3 below is one example of a programming guide.

TABLE 3

| User-Specific Programming guide | | | |
|---|---|---|---|
| Channel | 7 pm | 8 pm | 9 pm |
| 14 | Movie | | News |
| 17 | Sitcom | Talk Show | News |
| 21 | Tennis | Golf | Football |
| 23 | History | | Biography |

Table 3 shown above represents one of many different ways that can be used to organize the information generated in step 210. As shown above, the guide shows the programming of the user's favorite channels for a three-hours period when receiver 100 is expected to be powered on. If the user were to receive the guide at 9 pm, however, the guide might appear as Table 4.

TABLE 4

| User-Specific Programming guide | | | |
|---|---|---|---|
| Channel | 9 pm | 10 pm | 11 pm |
| 14 | News | Travel Guide | Talk Show |
| 17 | News | | Movies |
| 21 | Football | | Hockey |
| 23 | Biography | Home & Garden Show | |

It is noted that Tables 3 and 4 can be presented in different formats. For example, the user-specific programming guide can contain scheduling information for more than three hours. In another example, the user-specific programming guide can be scrolled down automatically or by the user to reveal more information. Note that the user-specific programming guide, such as that shown in Table 3 or Table 4, is significantly shorter than a typical programming guide that takes a long time to browse.

In step 212, memory 132 is updated with information generated in step 210.

In accordance with the embodiment shown above, each time the user powers on receiver 100 after step 212 or otherwise requests a programming guide, depending on the time of day, a variation of Table 3 or Table 4 would appear. The user can then select one of the channels that appears on the suggested list. In the specific example described above, the invention allows the user to browse his or her specific programming guide that comprises four favorite channels, effectively avoiding browsing information related to hundreds of other channels that are not of interest to the user.

Figure 3:
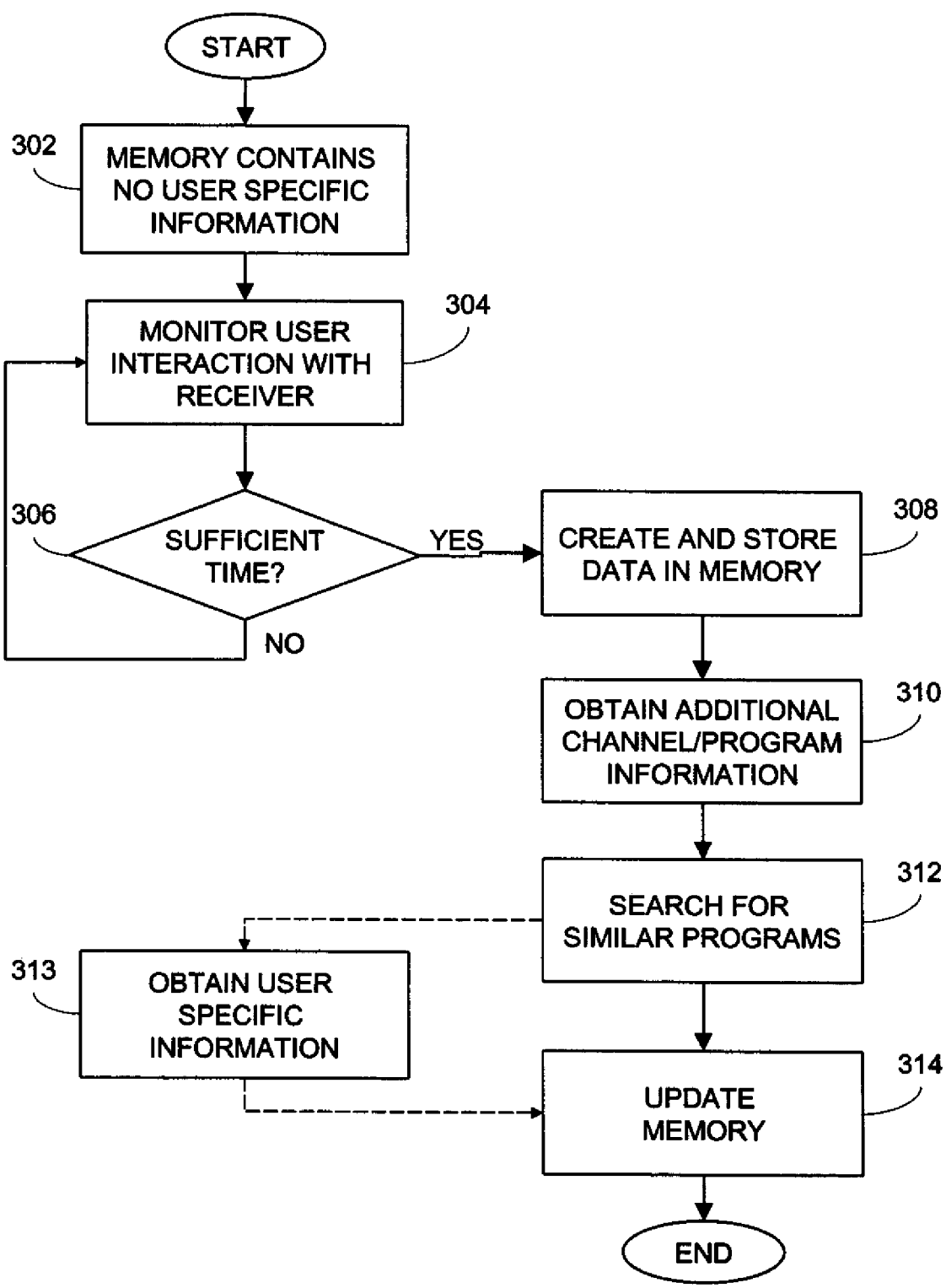
FIG. 3 is a flowchart illustrating exemplary steps involved in dynamically generating a programming guide in accordance with another embodiment of the present invention.

FIG. 3 is a flowchart illustrating exemplary steps involving in dynamically generating a TV programming guide for a user. In this embodiment, microcomputer 130 is adapted to monitor the activities of tuner 104.

In optional step 302, as in step 202, memory 132 of receiver 100 can be preloaded with preliminary channel information.

In step 304, as the user tunes in to different channels using tuner 104 at different times, microcomputer 130 stores in memory 132 information related to how tuner 104 is used or controlled by the user. For example, the information can be related to which channel was tuned in, for how long, and on what day.

In step 306, receiver 100, through microcomputer 130, memory 132, and tuner 104 monitors the user's interaction with respect to, for example, what channels the user tunes in, at what time, and on what day. After a suitable amount of time specified in step 306 has passed, receiver 100 can use the information collected in steps 304-306 to generate a programming guide and store it in memory 132. The amount of time can be, for example, two weeks. The amount of time can also be longer, for example, four weeks.

In one specific instance, assume that the user, for a period of four weeks, consistently tunes in to channel 26 between the hours of 6:30 pm and 7:00 pm every Monday, Tuesday, Wednesday, Thursday, and Friday. In this example, microcomputer 130 may be adapted to interpret that each time the user powers on receiver 100 between 6:30 pm and 7:00 pm on a week night, the user would want to view the program being broadcast on channel 26. Accordingly, it may be said that the user has a habit of viewing the program on channel 26 every weekday within that 30 minute time period. Similarly, further assume that the same or a different user consistently tunes in to Channel 7 on weekdays between 3:00 pm and 4:00 pm. In that respect, if receiver 100 is powered on during that time period on a weekday, receiver 100 assumes that the user would want to tune in to channel 7.

Accordingly, in step 308, microcomputer 130 may create a new table and store the table in memory 132. The new table may comprise, for example, information shown in Table 5 below.

TABLE 5

User's Viewing Habits

| Day of Week | Time of Day | Channel |
| --- | --- | --- |
| Monday-Friday | 3:00 pm-5:00 pm | 7 |
| Monday-Friday | 6:30 pm to 7:00 pm | 26 |

Thus, each time the user powers on receiver 100 or otherwise requests for a programming guide after step 308, a user-specific programming guide can be provided based on information stored in memory 132. For example, when the user powers on receiver 100, Table 6 below may appear on monitor 124 as follows.

TABLE 6

User-Specific Programming guide
Please Pick One of Your Favorite Channels 7
26

Table 6 may be presented in different ways. For example, Table 7 may be presented when receiver 100 is powered on at 2:50 pm on a weekday.

TABLE 7

Programming guide on Weekdays
Your Favorite Programs Are Scheduled to Be Broadcast At 3 pm on Channel 7
At 6:30 pm on Channel 26

In addition, microcomputer 130 may be programmed to tune in to the user's favorite channel directly, without offering the programming guide first. For example, if the user were to power on receiver 100 between 3 pm and 4 pm, microcomputer 130 tunes in to Channel 7 directly without providing any programming guide.

Table 8 represents an exemplary programming guide that can be displayed on monitor 124 when receiver 100 is powered on or when the programming guide is requested at a time when there is no favorite channel available. For example, no favorite channels for the users have been established for Saturdays and Sundays.

TABLE 8

Programming guide on Weekends

Your Favorite Channels Are

| Channel 7 | For weekdays between 3 and 4 pm |
| Channel 26 | For weekdays between 6:30 pm and 7:00 pm |

May We Also Suggest

| Channel 107 | Which broadcasts programs similar to that you like on Channel 7 |
| Channel 126 | Which is affiliated with Channel 26 |

Table 8 contains a list of four channels, two of which were a product of steps 304 through 308. Specifically, channels 7 and 26 are included in Table 8 based on information collected in steps 304 through 308. Channels 107 and 126 may be created, for example, in steps 310 through 314 described below.

In step 310, microcomputer 130 can be adapted to obtain additional information related to a habit of the user that was established in steps 304-308. The additional information can be obtained, for example, from external sources that are accessible via computer network 190. For example, from one or more external sources 182 via computer network 190, microcomputer 130 can obtain specific information about the favorite programs of the user. Specifically, from an external source that is associated with Channel 7, it may be determined that Channel 7 broadcasts a popular soap opera between the hours of 3 pm and 4 pm on weekdays. Similarly, through the same or a different external source, it may be determined that Channel 26 broadcasts financial news on weekdays from 6:30 pm to 7:00 pm. Table 9 is an example of how such information may be stored in memory 132. The similar and additional information may also be derived from broadcast signals 101 through a filter or splitter (not shown) of receiver 100.

TABLE 9

Additional Information of Favorite Channels

| Day of Week | Time of Day | Channel | Genre |
|---|---|---|---|
| Monday-Friday | 3:00 pm-5:00 pm | 7 | Soap Opera |
| Monday-Friday | 6:30 pm to 7:00 pm | 26 | Financial News |

In step 312, based on the information obtained in step 310, microcomputer 130 can be adapted to access the same or other external sources via computer network 190 for similar programs. For example, it may be determined that Channel 107 broadcasts old episodes of various soap operas all day long everyday. Similarly, it may be determined that Channel 126 is affiliated with Channel 26 and specializes in financial news reporting. Table 10 is an exemplary format of how such additional information may be organized in memory 132.

TABLE 10

Additional Channels Similar to Favorite Channels

| Favorite Channel | Genre | Also Suggest |
|---|---|---|
| Channel 17 | Soap Opera | Channel 107 |
| Channel 26 | Financial News | Channel 126 |

In step 314, memory 132 is updated by microcomputer 130 with the information obtained and processed in steps 310 through 312. It is noted that each of the favorite channels can have more than one suggested channel associated with it.

Optionally, microcomputer 130 can be adapted to obtain additional information from the user in step 313. For example, the user can input his or her name in step 313. Memory 132 can be updated in step 314, resulting in, for example, Table 11 below.

TABLE 11

Programming Guide for Smith Family

| Day of Week | Time of Day | Channel | Type of Content | User |
|---|---|---|---|---|
| Monday-Friday | 3:00 pm-5:00 pm | 7 | Soap Opera | Gary Smith |
| Monday-Friday | 6:30 pm to 7:00 pm | 26 | Business News | Tammy Smith |

Figure 4:
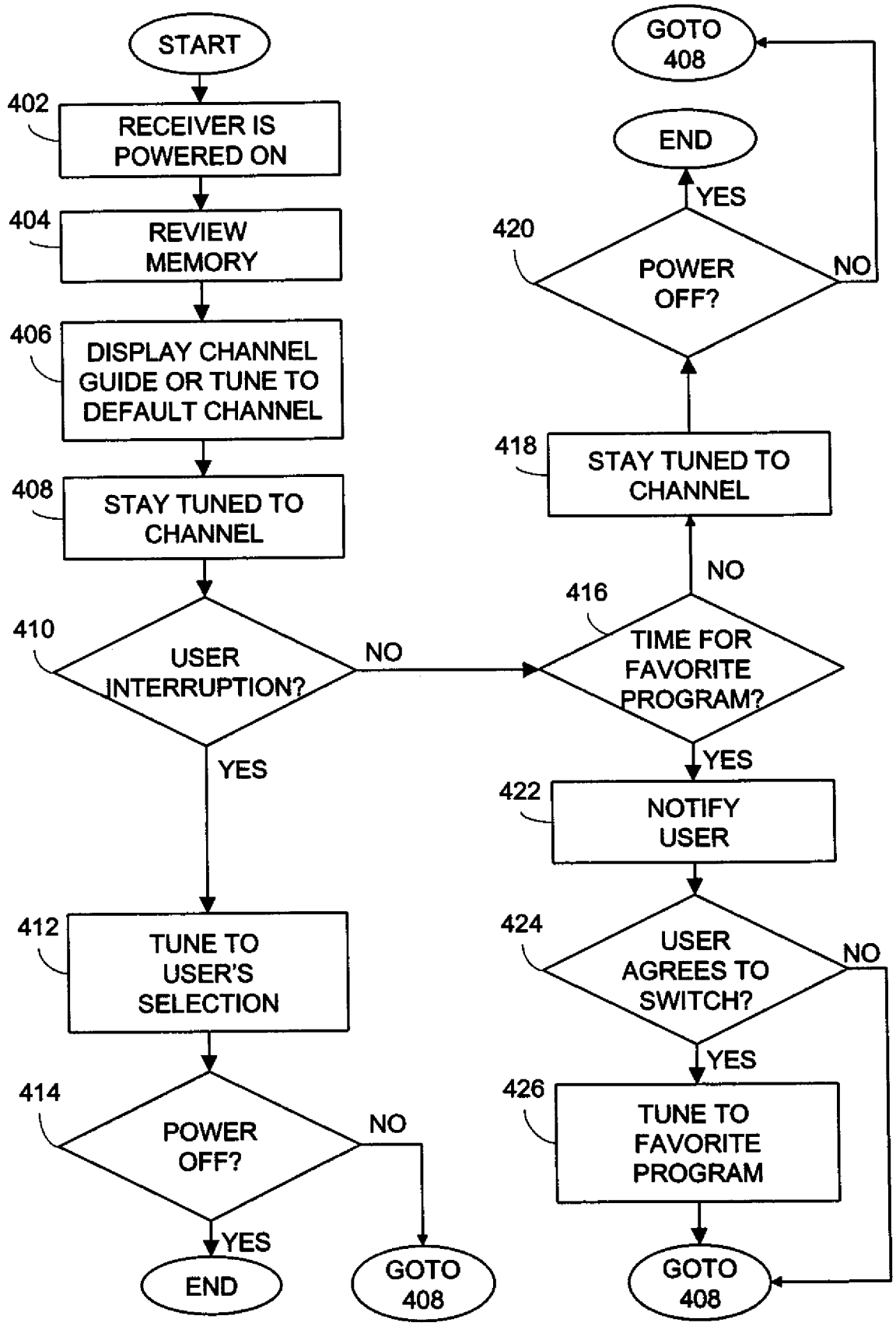
FIG. 4 is a flowchart illustrating exemplary steps involved in using one embodiment of the present invention.

FIG. 4 is a flowchart illustrating exemplary steps involved in using one embodiment of the present invention.

In step 402, receiver 100 is powered on.

In step 404, microcomputer 130 reviews the information contained in memory 132.

In step 406, microcomputer 130 instructs tuner 104 to display a programming guide as discussed above or tune in to a default channel. The default channel can be one of several channels, as specified by the manufacturer or by the user. The default channel can be, for example, the last channel tuned in to during the previous viewing session. The default channel may be, alternatively, the most frequently tuned in channel at that time and day. In step 406, one of the tables shown above, or a variation thereof, may be displayed on monitor 124 as a short list of suggested channels.

In step 408, receiver 100 stays tuned to the channel previously selected unless the user interrupts in step 410.

In step 410, the user may interrupt by doing one of several things. First, the user may press a specific button to tune in a specific channel associated with the specific button. Second, the user may press the "channel up" or the "channel down" button to view a different channel. If the user interrupts, the process goes to step 412; otherwise, the process goes to step 416.

In step 412, microcomputer 130 tunes in to the channel selected by the user in step 410. In step 414, unless receiver 100 is powered off, the process returns to step 408.

In step 416, microprocessor 130 continues to review the contents of memory 132. If it is time for a favorite program, microprocessor 130 notifies the user in step 422. Otherwise, the process proceeds to step 418 and stays tuned in to the channel. Depending on whether receiver 100 is powered off in step 420, the process returns to step 408 or ends.

In step 422, after determining in step 416 that a favorite program is about to start, microprocessor 130 notifies the user that it is time for a favorite program. Microprocessor 130 can be adapted to notify the user in one of several ways. For example, a pop-up window may come up to notify the user that a favorite program is about to be broadcast in another channel. Alternatively, microprocessor 130 can run a banner across the screen to notify the user. Still, sound generator 160, adder 162, and speaker 114 can be used to notify the user by sound.

In step 424, microcomputer 130 awaits the user's respond to the notification. If the user agrees to switch, the process goes to step 426, otherwise, the process goes to step 408.

In step 426, microcomputer 130 tunes in to the favorite channel. When the program of the favorite channel has concluded, the process returns to step 408.

Figure 5:
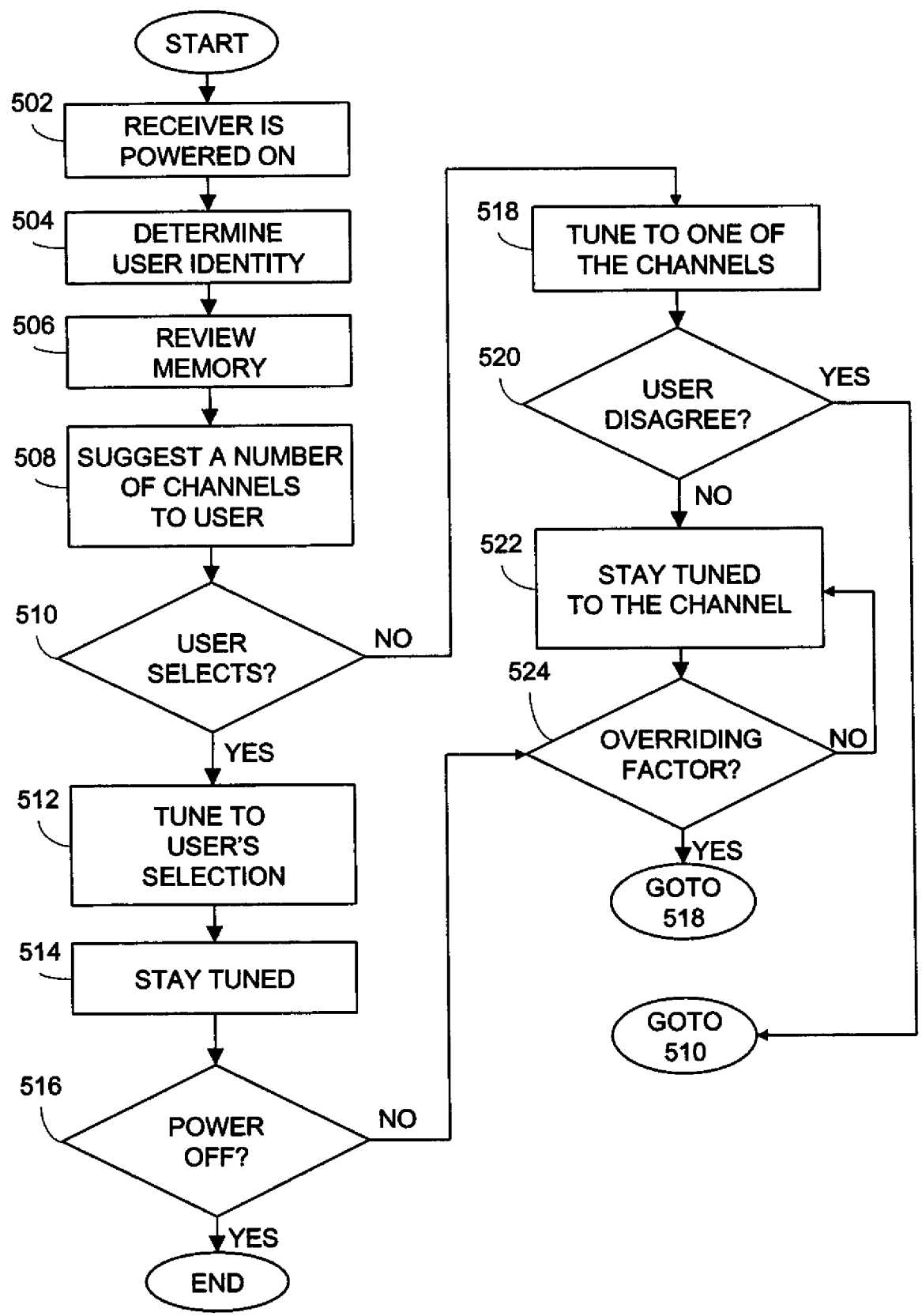
FIG. 5 is a flowchart illustrating exemplary steps involved in using another embodiment of the present invention.

FIG. 5 is a flowchart illustrating exemplary steps involved in using another embodiment of the present invention.

In step 502, receiver 300 is powered on.

In step 504, microcomputer 130 determines identity of the user. This step can be preformed using any known methods, including those disclosed in the patents incorporated by reference.

In step 506, microcomputer 130 reviews the information related to the user in memory 132.

In step 508, microcomputer 130 suggests a number of favorite channels that are specific to the user. For example, if the user is Gary Smith, then only Gary's favorite channels would be suggested by receiver 100. Preferably, the number is between about three and about five channels. The list of suggested channels (the programming guide) can be based on the frequency of the channels viewed within, for example, the previous two weeks. The programming guide can also be generated using other method and criteria.

In step 510, if the user picks one of the suggested channels, the process goes to step 512. If the user does not pick any of the channels, the process goes to step 518.

In step 512, microcomputer 130 receives the response and instructs tuner 104 to tune in to the channel selected by the user in step 510.

In step 514, receiver 100 stays tuned to the channel.

In step 516, unless receiver 100 is powered off, the process goes to step 524.

In step 518, microcomputer 100 instructs tuner 104 to tune in to one of the favorite channels on the programming guide. Tuner 104 may tune in to the channel that has the most frequency of viewing in the past.

In step 520, if the user disagrees with the selection, the process goes to step 510. If the user agrees with or does not object to the selection in step 520, the process goes to step 522.

In step 522, receiver 100 stays tuned to the channel tuned in step 518.

In step 524, microcomputer 130 determines whether there is an overriding factor. An overriding factor can be, for example, a show time for another favorite channel has arrived, and if so, the process returns to step 518.

Figure 6:
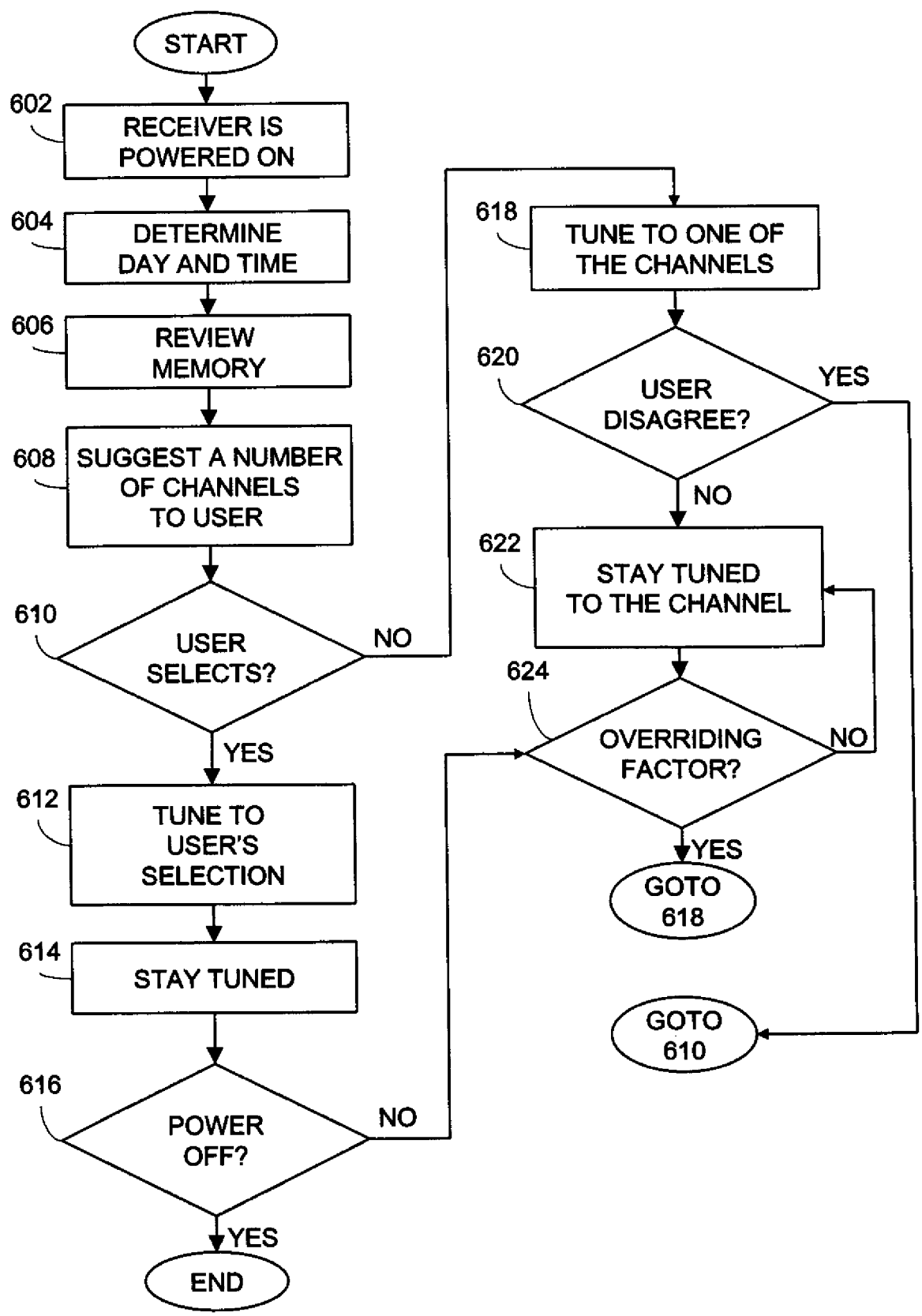
FIG. 6 is a flowchart illustrating exemplary steps involved in using yet another embodiment of the present invention.

FIG. 6 is a flowchart illustrating exemplary steps involved in using another embodiment of the present invention. The steps involved in FIG. 6 is generally same as those corresponding steps discussed above in FIG. 5. In step 604, however, instead of determining the identity of the user as was done in step 504, the current day and time is determined. The current day and time is then used to generate the programming guide. In step 608, for example, the programming guide may comprise a list of programs associated with favorite channels that are being broadcast or are about to be broadcast within three hours (e.g., see one of Tables 3 and 4).

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of exemplary steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

The invention claimed is:

1. A method, comprising:
receiving, by a server, selections of contents associated with a user identity, the user identity associated with a user;
determining, by the server, favorite genres of the contents associated with times of days, the favorite genres of the contents based on the selections of the contents associated with the user identity;
receiving, by the server, a request for a programming guide, the request for the programming guide associated with the user identity, the request for the programming guide specifying a time of day;
comparing, by the server, the favorite genres of the contents associated with the times of days to the time of day specified by the request for the programming guide;
determining, by the server, that none of the favorite genres of the contents is associated with the time of day specified by the request for the programming guide;
in response to none of the favorite genres of the contents being associated with the time of day specified by the request for the programming guide, selecting, by the server, a favorite genre of the favorite genres of the contents;
selecting, by the server, a related program that is related to the favorite genre selected from the favorite genres of the contents in response to none of the favorite genres of the contents being associated with the time of day; and
generating, by the server, a suggestion for the related program in response to the determining that none of the favorite genres of the contents is associated with the time of day specified by the request for the programming guide.

2. The method of claim 1, further comprising retrieving information associated with the related program.

3. The method of claim 1, further comprising generating the programming guide.

4. The method of claim 1, further comprising organizing the favorite genres of the contents.

5. The method of claim 1, further comprising selecting multiple programs associated with the favorite genre.

6. The method of claim 1, further comprising selecting a content offering associated with the favorite genre.

7. The method of claim 1, further comprising organizing the favorite genres of the contents according to the time of day.

8. An apparatus, comprising:
a hardware processor; and
a memory device, the memory device storing code, the code when executed causing the hardware processor to perform operations, the operations comprising:
determining favorite genres of contents based on habitual content selections;
generating an electronic table that electronically associates the favorite genres of contents according to time;
receiving a request for a programming guide, the request for the programming guide specifying a time of day;
querying the electronic table for the time of day specified in the request for the programming guide;
determining that the electronic table lacks an entry for the time of day specified by the request for the programming guide;
selecting one of the favorite genres of contents from the electronic table after the determining that the electronic table lacks the entry for the time of day specified by the request for the programming guide;
determining a program associated with the one of the favorite genres of contents selected from the electronic table;
selecting a related program that is related to the program associated with the one of the favorite genres of contents selected from the electronic table; and
generating a suggestion for the related program as a response to the request for the programming guide.

9. The apparatus of claim 8, wherein the operations further comprise generating the programming guide.

10. The apparatus of claim 8, wherein the operations further comprise selecting a title associated with the one of the favorite genres of contents.

11. The apparatus of claim 8, wherein the operations further comprise displaying the favorite genres of contents.

12. The apparatus of claim 8, wherein the operations further comprise displaying any content associated with the one of the favorite genres of contents.

13. The apparatus of claim 8, wherein the operations further comprise selecting content offerings associated with the one of the favorite genres of contents.

14. The apparatus of claim 8, wherein the operations further comprise selecting content offerings associated with the favorite genres of contents.

15. A memory device storing instructions that when executed cause a hardware processor to perform operations, the operations comprising:

determining favorite genres of contents based on habitual content selections;

generating an electronic table that electronically associates the favorite genres of contents according to time;

receiving a request that specifies a time of day;

querying the electronic table for the time of day specified in the request;

determining that the electronic table lacks an entry for the time of day specified by the request;

selecting any one of the favorite genres of contents from the electronic table in response to the electronic table lacking the entry for the time of day specified in the request;

determining a program associated with the any one of the favorite genres of contents selected from the electronic table;

selecting a related program that is related to the program associated with the any one of the favorite genres of contents selected from the electronic table; and generating a suggestion as a response to the request specifying the time of day, the suggestion specifying a title of the related program associated with the any one of the favorite genres of contents selected from the electronic table.

16. The memory device of claim 15, wherein the operations further comprise generating a programming guide.

17. The memory device of claim 15, wherein the operations further comprise generating a programming guide based on the favorite genres of contents.

18. The memory device of claim 15, wherein the operations further comprise displaying the favorite genres of contents as the response to the request.

19. The memory device of claim 15, wherein the operations further comprise selecting multiple content offerings associated with the any one of the favorite genres of contents.

20. The memory device of claim 15, wherein the operations further comprise selecting content titles associated with the any one of the favorite genres of contents.

\* \* \* \* \*